United States Patent [19]
Mason et al.

[11] Patent Number: 5,211,168
[45] Date of Patent: May 18, 1993

[54] MOVING ELECTRODE TRANSDUCER FOR REAL TIME ULTRASOUND IMAGING FOR USE IN MEDICAL APPLICATIONS

[75] Inventors: Martin K. Mason, Andover, Mass.; F. Stuart Foster, Toronto, Canada

[73] Assignee: Hewlett-Packard Company, Palo Alto, Calif.

[21] Appl. No.: 812,524

[22] Filed: Dec. 20, 1991

[51] Int. Cl.$^5$ .............................................. A61B 8/00
[52] U.S. Cl. .............................................. 128/661.01
[58] Field of Search ...................... 128/661.01, 662.03; 73/625–626; 310/336, 365

[56] References Cited

U.S. PATENT DOCUMENTS

3,779,234  12/1973  Eggleton et al. .............. 128/662.06

*Primary Examiner*—Francis Jaworski

[57] ABSTRACT

An ultrasound scanning system includes an array of transducer elements and an electrode array, movable with respect to the array to transducer elements. The electrode array is in electrical contact with transducer elements from the array of transducer elements which are immediately adjacent to the electrode array. The piezoelectric ceramic material is situated between the two-dimensional array of electrodes and the common ground electrode. Each electrode in the two-dimensional array of electrodes is electrically isolated from the other electrodes in the two-dimensional array of electrodes. The piezoelectric ceramic material may be arranged to form pillars, each pillar extending from an electrode from the two-dimensional array of electrodes to the common ground electrode. The movable electrode array is mounted on, for example, a thin Mylar membrane. The movable electrode array may be arranged in a variety of patterns. For example, the movable electrode array may be a single electrode, a plurality of annuli, a linear array or in a Fresnel pattern. Alternately, the electrode array may be mounted on a plate rotated with respect to the array of transducer elements.

15 Claims, 7 Drawing Sheets

MOVING ELECTRODE TRANSDUCER FOR REAL TIME ULTRASOUND IMAGING FOR USE IN MEDICAL APPLICATIONS

BACKGROUND

It is common practice in the field of ultrasonic imaging to make real time images of the human body by means of a linear array of transducer elements. For example, in FIG. 1 a linear array of transducer elements 8 is shown. Groups of transducer elements from transducer elements 8 are sequentially excited by electrical pulses from transmitters 1 through an element group selection unit 12 through wires 13. The result is an ultrasonic wave 14 generated in a direction along a z-axis 11, perpendicular to the linear array of transducer elements 8, as shown. When ultrasonic wave 14 is directed into a body, reflections of ultrasonic wave 14 are detected by the group of transducer elements having generated ultrasonic wave 14 or by a larger group of transducer elements from transducer elements 8. By dynamically varying the delay for each received signal, it is possible to obtain a sharply focused image in the azimuthal plane of the array, that is in the plane defined by an x-axis 9 and z-axis 11.

Figure 2:
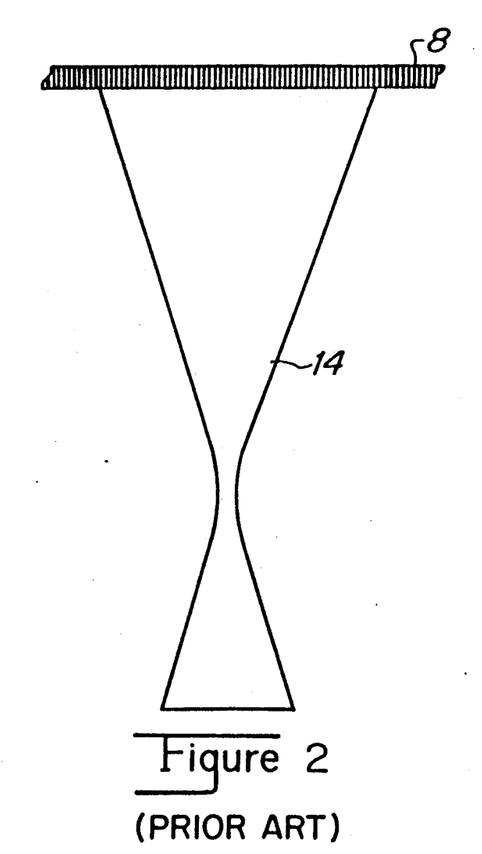

Ultrasound information is gathered typically for 64 to 256 discrete rays by shifting the groups of array elements used in transmission over the field of view. As shown in FIG. 2, as many as 128 transducer elements may be used to generate ultrasonic wave 14.

Reflected signals from ultrasonic wave 14 are received by transducer elements 8, transferred through wires 13, through element group selection unit 12 to a focus delay 3. Focus delay 3 varies the delay for each signal in order to obtain a sharply focussed image. The delayed signals are then summed by a Sum unit 2 and amplified as a function of depth by a depth gain control (DGC) 4 to compensate for attenuation. The signals are processed by a detector 5 and stored in a scan converter 6. The output of scan converter 6 is used to drive video monitor 7.

The detected signals at each position along x-axis 9 from ultrasound ray 14 are mapped to a corresponding ray on video monitor 7. The length of time between emission of ultrasound signals and receipt of reflections of the ultrasound signals indicates depth in the direction of z-axis 11 of an object causing the reflection. The brightness of particular portions of an image shown on monitor 7 is determined by the amount of reflected ultrasound from corresponding portions of the body Typical systems are able to generate between ten and thirty images per second essentially allowing display of an image to be a "real time" representation of scanned bodies.

Figure 1:
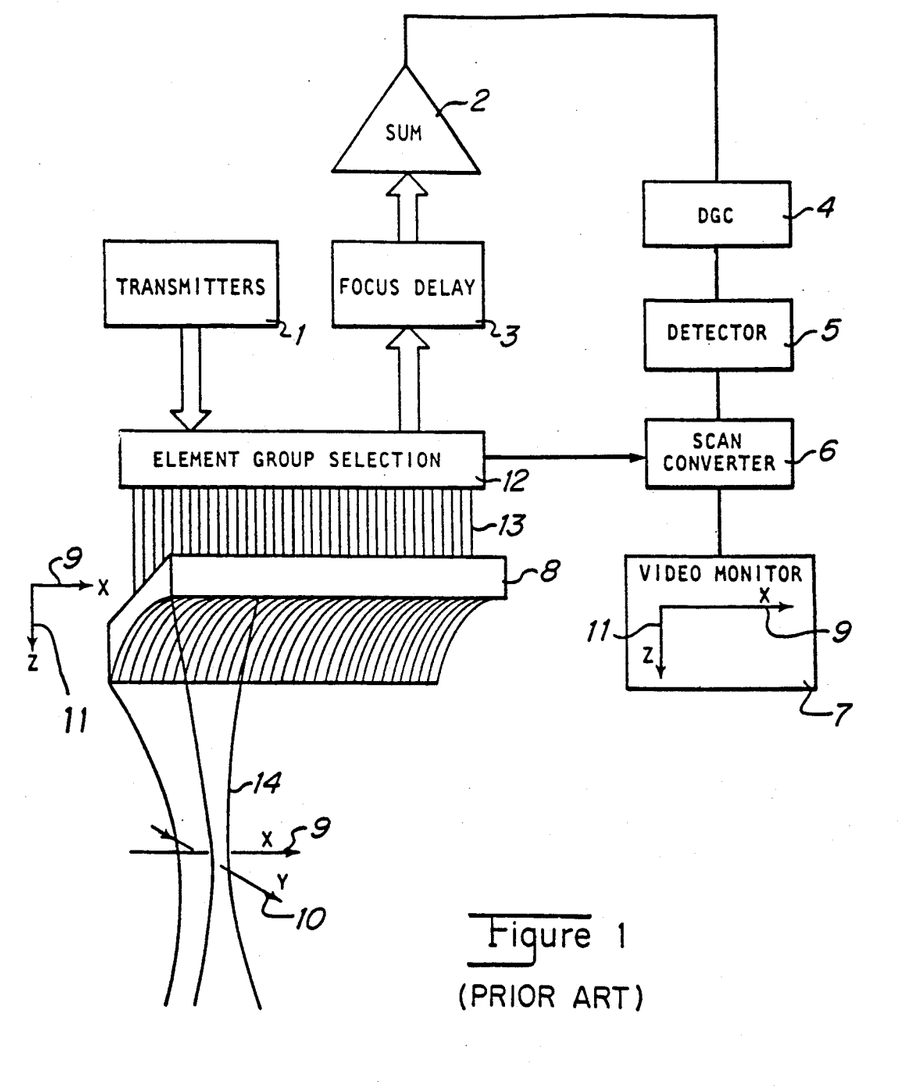
FIGS. 1 and 2 show a prior implementation of a scanning system using a linear array of transducer elements.

The most serious drawback to the above technology is the poor focus that is obtained in the elevation plane—defined by z-axis 11 and a y-axis 10—perpendicular to the azimuthal plane of the array. The problem is often compensated for by applying a lens to the surface of linear array of transducer elements 8. This offers improvement over a limited depth of field, but, at certain depths, the resolution of the elevation plane can still be as much as ten time worse than resolution of the azimuthal plane.

Another method to improve the situation is to divide linear array of transducer elements 8 into a number of sections in the direction of y axis 10, thus producing a two-dimensional array of transducer elements. Unfortunately, each elements would need separated electrical connection and separate electronic processing up to the point at which signals are summed. Even with large scale integration, the total number of elements than can presently be processed in real time is limited to about 128. Therefore, the step to a full two-dimensional array is presently impractical.

Similarly, in the prior art, when it is desired to rotate the scan plane of a transducer, the entire array is rotated. This means that either the outer surface of the array rotates against body tissue, or there is an intermediate fluid layer and a separate acoustic window. Both approaches involve rotary seals. The latter approach may result in degraded image quality.

SUMMARY OF THE INVENTION

In accordance with the preferred embodiment of the present invention an ultrasound scanning system is presented which includes an array of transducer elements and an electrode array, movable with respect to the array to transducer elements. Electrodes from the electrode array are in electrical contact with transducer elements from the array of transducer elements which are immediately adjacent to the electrodes.

The array of transducer elements may include a two-dimensional array of electrodes, a common ground electrode and piezoelectric ceramic material. The piezoelectric ceramic material is situated between the two-dimensional array of electrodes and the common ground electrode. Each electrode in the two-dimensional array of electrodes is electrically isolated from the other electrodes in the two-dimensional array of electrodes. The piezoelectric ceramic material may be arranged to form pillars, each pillar extending from an electrode from the two-dimensional array of electrodes to the common ground electrode.

The movable electrode array is mounted on, for example, a thin Mylar membrane. The movable electrode array may be arranged in a variety of patterns. For example, the movable electrode array may be a single electrode, a plurality of annuli, a linear array or in a Fresnel pattern.

The present invention allows for a full two-dimensional array to be utilized using circuitry sufficient to process only seven to twelve elements. Such a scheme provides for the presentation of a sharply focussed image in both the azimuthal and elevation planes.

In an alternate preferred embodiment of the present invention, the electrode array is mounted on a plate which rotates with respect to the array of transducer elements. This allows the rotation of the scan plane while keeping a completely stationary sealed transducer array against the scanned object.

DESCRIPTION OF THE PREFERRED EMBODIMENT

Figure 3:
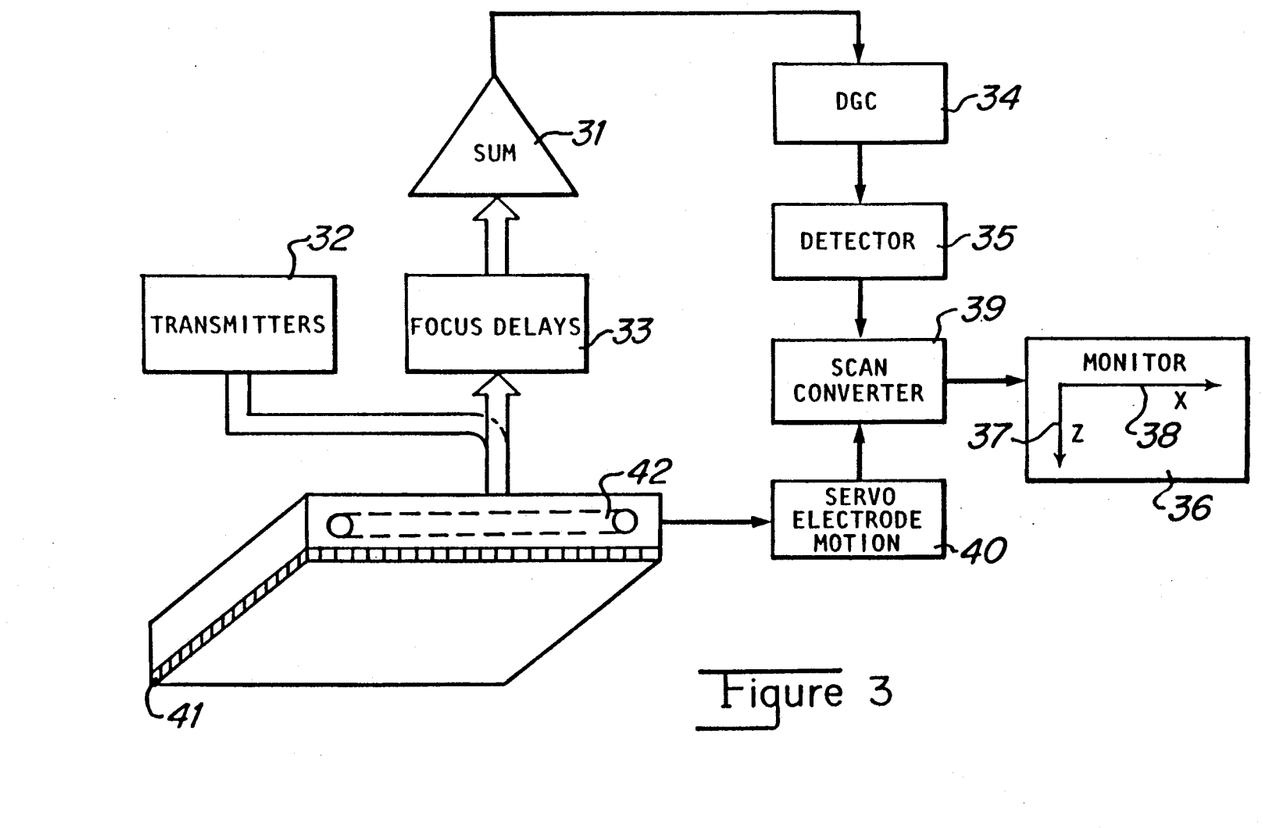
FIG. 3 shows a scanning system using an array of transducer elements in accordance with the preferred embodiment of the present invention.

In FIG. 3 is shown a scanning system using a full two-dimensional array of transducer elements 41. An electrode array 61 (shown in FIG. 5) mounted on a thin Mylar membrane 42 and separated from array of transducer elements 41 is used to select which transducers elements from array of transducer elements 41 are activated to transmit and receive ultrasonic waves. Because of its light weight, thin Mylar membrane is used; therefore, little inertia must be overcome when quickly shuttling electrode array 61 back and forth at sufficient speeds to allow for real time imaging. Any other material of sufficient strength, flexibility and light weight may be used to replace thin Mylar membrane 42.

Ultrasonic waves are generated by transmitters 32 coupled to the electrode array 61. Reflections from the ultrasonic waves are received by transducer elements 41, transferred through electrode array 61 to a focus delay 33. Focus delay 33 varies the delay for each signal in order to obtain a sharply focussed image. The delayed signals are then summed by a Sum unit 31 and amplified as a function of depth by a depth gain control (DGC) 34 to compensate for attenuation. The signals are processed by a detector 35 and stored in a scan converter 39. The output of scan converter 39 is used to drive video monitor 36. A servo electrode motion unit 40 supplies scan converter 39 with information about the location of electrode array 61.

The detected signals at each position along x-axis 38 from the ultrasound rays are mapped to a corresponding ray on video monitor 36. The length of time between emission of ultrasound signals and receipt of reflections of the ultrasound signals indicates depth in the direction of z-axis 37 of an image causing the reflection. The brightness of particular portions of an image shown on monitor 36 is determined by the amount of reflected ultrasound from corresponding portions of the body.

Figure 4:
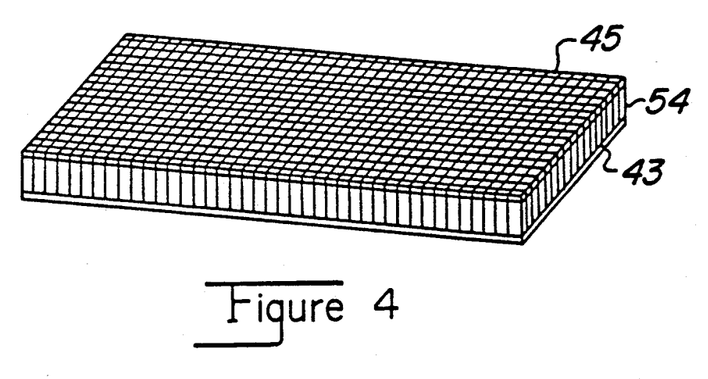
FIG. 4 shows a preferred embodiment of an array of transducer elements used in the scanning system shown in FIG. 3.

FIG. 4 shows an embodiment of array of transducer elements 41. A common ground electrode 43 is placed in contact with a body to be scanned. A two-dimensional array 54 composed of pillars of piezoelectric ceramic separated by interstitial regions of epoxy 81 (shown in FIG. 7) covers common ground electrode 43. A two-dimensional array of electrodes 45 is placed over two dimensional array 54. Each pillar from array 54 has associated with it a single electrode isolated from other electrodes from two-dimensional array of electrodes 45.

Figure 5:
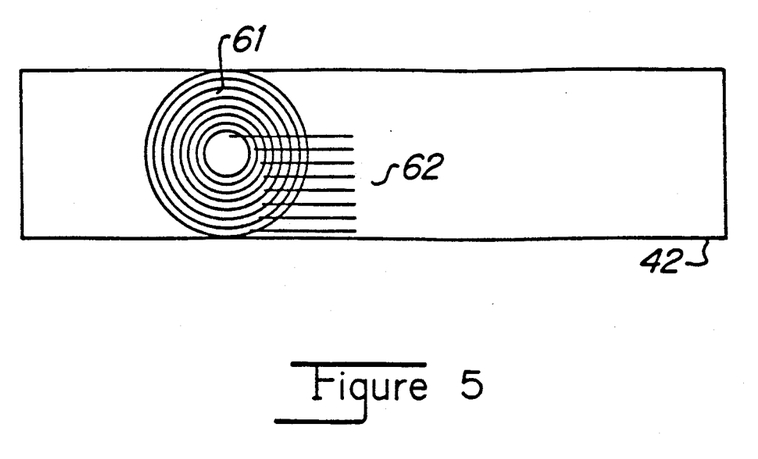
FIG. 5 shows a moving annular electrode array used in the scanning system shown in FIG. 3.

In FIG. 5, electrode array 61 is shown mounted on thin Mylar membrane 42. Although electrode array 61 may be in any shape, in FIG. 5 electrode array is shown composed of annuli. The annuli allow images to be scanned with equal resolution in both the azimuthal plane and the elevation plane. Electrode array 61 is connected to focus delays 33 and transmitters 32 through leads 62.

Figure 6:
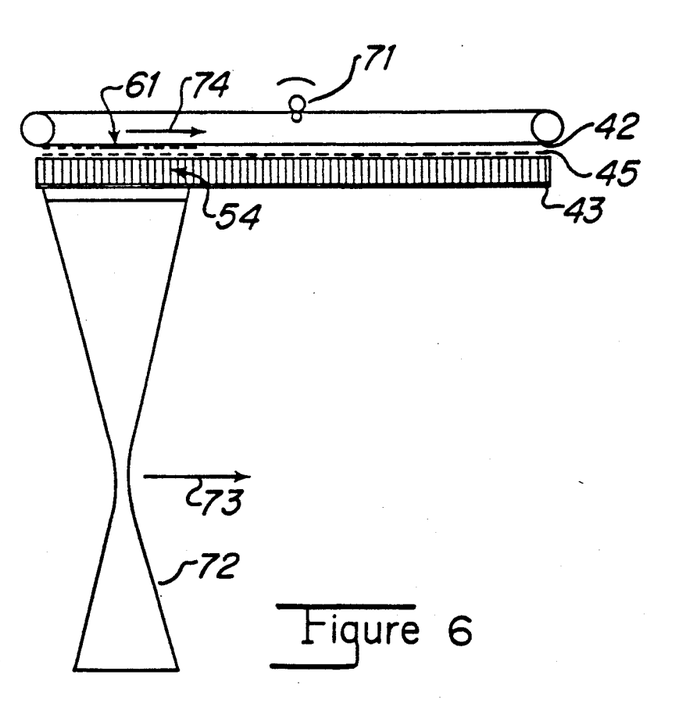
FIGS. 6 and 7 show the moving annular electrode array shown in FIG. 6 used in conjunction with the transducer elements shown FIG. 4 in accordance with a preferred embodiment of the present invention.

In FIG. 6, thin Mylar membrane 42 is shown being driven by a servo motor 71. As a result electrode array 61 is moved along top of two-dimensional array of electrodes 45. As electrode array 61 is moved electrical contact is made with those electrodes from array of electrodes 45 which are immediately under the current position of electrode array 61. As signals are generated by transmitters 32 the signals are transferred through electrode array 61 into electrodes from two-dimensional array of electrodes 45 which are immediately under electrode array 61. In FIG. 6, active elements 55 are those pillars of piezoelectric ceramic from two-dimensional array 54 which are under electrode array 61 and are therefore active. In this way an ultrasound wave 72 is generated from pillars of piezoelectric ceramic in the pattern of electrode array 61. As servo motor 71 moves thin Mylar membrane 42 and thus electrode array 61 in a direction 74, ultrasound wave 72 is moved in a direction 73.

Figure 7:
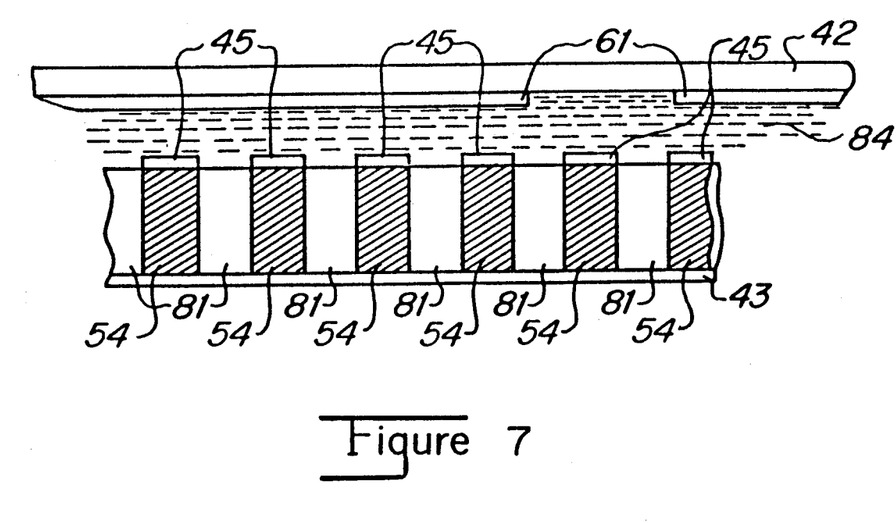

In FIG. 7 detail is given of how electrode array 61 is placed in electrical connection with electrodes from array of electrodes 45. In FIG. 7 a conducting or dielectric medium 84 is shown placed between thin Mylar membrane 42 and array of electrodes 45. Medium 84 provides electrical contact between electrode array 61 and electrodes from two-dimensional array of electrodes 45. Each separate electrode in moving electrode array 61 preferentially activates only those elements of the two dimensional transducer electrode array 45 that lie in close proximity to moving electrode array 61. The amount of cross talk between element groups is controlled by the conductive and dielectric properties of coupling medium 84. Some electrode elements will exhibit noise which is minimized by careful choice of the properties of coupling medium 84.

Figure 8:
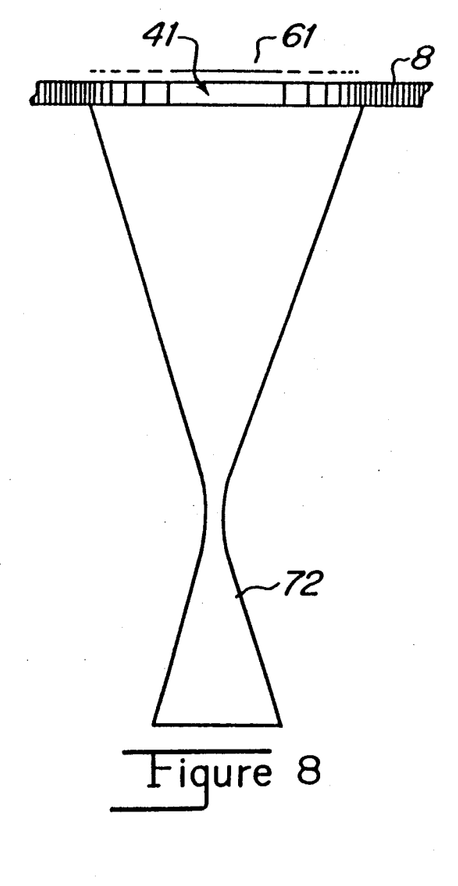
FIG. 8 shows effective element groupings of activated transducer elements for the scanning system shown in FIG. 3.

Electrode array 61 may also be a Fresnel pattern as shown in FIG. 8. Such a pattern has the advantage of further reducing the number of required electrodes in electrode array 61, thus significantly reducing the circuitry necessary to generate and process ultrasonic waves and their reflections. Electrode array 61 may also be arranged in other patterns, for example, as a linear array or as a single electrode.

Figure 9:
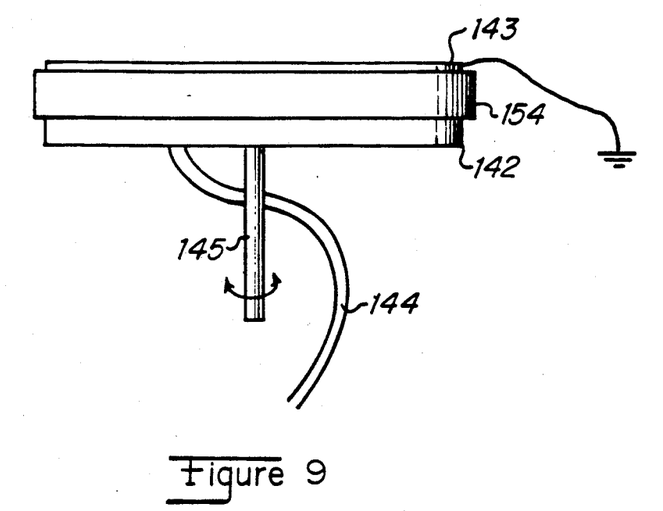
FIG. 9 and FIG. 10 show an alternate preferred embodiment of the present invention which provides for rotation of the scan plane of an ultrasound transducer.
Figure 10:
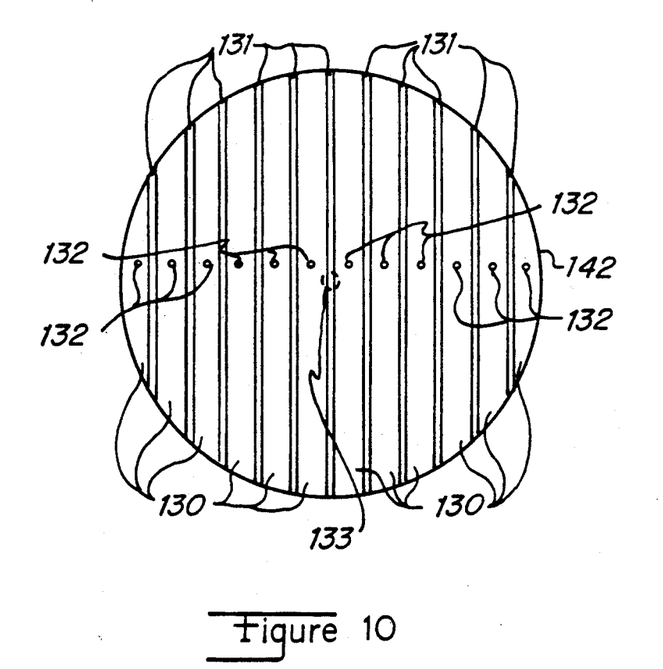

FIG. 9 and FIG. 10 show an alternate preferred embodiment of the present invention. In several types of medical ultrasound transducers it is useful to be able to rotate the scan plane of the sensor. This can allow alignment of the sector plane with anatomical features or it can allow a volume to be swept out. In endoscopic probes, such as transrectal or transesophageal transducers, it is necessary to perform this rotation remotely while the outer housing remains stationary.

In FIG. 9, a circular piezoelectric element disc 154 is fixedly mounted in a transducer housing. A ground plane 143 is attached to the outer surface of circular piezoelectric element disc 154. For example, piezoelectric element disc 154 is a two-dimensional array composed of pillars of piezoelectric ceramic separated by interstitial regions of epoxy. A plate 142 is pressed against circular piezoelectric element disc 154. Plate 142 is rotated by an axle 145. A multiple-conductor cable 144 contains conductors which are connected to electrodes on the surface of plate 142. Sufficient extra length is allowed in multiple-conductor cable 144 to allow rotation of plate 142.

FIG. 10 shows an electrode pattern on the surface of plate 142. Electrodes 130 contact piezoelectric elements of circular piezoelectric element disc 154 forming active areas of the ultrasound transducer. Gaps 131 electrically isolate electrodes 130 from each other. Conductors within multiple-conductor cable 144 are individually connected to electrodes 130 by connection points 132 through plate 142. As plate 142 is rotated around an axis of rotation 133, the active elements within circular piezoelectric element disc 154 are rotated, accomplishing the desired scan plan rotation.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. An ultrasound scanning system comprising:
   a plurality of transducer elements arranged in a two-dimensional array; and,
   a plurality of electrodes arranged in a two dimensional pattern, the plurality of electrodes being movable with respect to the two dimensional array of transducer elements, electrodes from the plurality of electrodes being in electrical contact with transducer elements from the two dimensional array of transducer elements which are immediately adjacent to the electrodes so that electrical signals placed through the plurality of electrodes result in generation of an ultrasound wave by the plurality of transducer elements which substantially conforms to the two dimensional pattern.

2. An ultrasound scanning system comprising:
   an array of transducer elements including:
      a two-dimensional array of electrodes, each transducer element including a single electrode from the two-dimensional array of electrodes, each electrode from the two-dimensional array of electrodes being electrically isolated from other electrodes in the two-dimensional array of electrodes,
      a common ground electrode, and
      piezoelectric ceramic material between the two-dimensional array of electrodes and the common ground electrode; and,
   an electrode array, movable with respect to the array of transducer elements, electrodes from the electrode array being in electrical contact with transducer elements from the array of transducer elements which are immediately adjacent to the electrodes.

3. An ultrasound scanning system as in claim 2 wherein the piezoelectric ceramic material is arranged to form pillars electrically isolated from each other, each pillar extending from an electrode from the two-dimensional array of electrodes to the common ground electrode.

4. An ultrasound scanning system comprising:
   an array of transducer elements; and,
   an electrode array, movable with respect to the array of transducer elements, electrodes from the electrode array being in electrical contact with transducer elements from the array of transducer elements which are immediately adjacent to the electrodes;
   wherein the electrode array comprises a plurality of annuli.

5. An ultrasound scanning system comprising:
   an array of transducer elements; and,
   an electrode array, movable with respect to the array of transducer elements, electrodes from the electrode array being in electrical contact with transducer elements from the array of transducer elements which are immediately adjacent to the electrodes;
   wherein the electrode array is arranged in a Fresnel pattern.

6. An ultrasound scanning system as in claim 1 additionally comprising a thin Mylar membrane on which the plurality of electrodes is mounted.

7. An ultrasound scanning system comprising:
   an array of transducer elements; and,
   an electrode array, movable with respect to the array of transducer elements, electrodes from the electrode array being in electrical contact with transducer elements from the array of transducer elements which are immediately adjacent to the electrodes;
   wherein the electrode array rotates with respect to the array of transducer elements.

8. An ultrasound scanning system as in claim 7 wherein the electrode array comprises electrodes mounted on a plate and electrically isolated from each other by gaps.

9. An ultrasound scanning system comprising:
   a plurality of transducer elements arranged in a two-dimensional array; and,
   at least one electrode, movable with respect to the two dimensional array of transducer elements, the at least one electrode at all times being in electrical contact with more than one transducer elements from the plurality of transducer elements which are immediately adjacent to the at least one electrode array so that electrical signals placed through the at least one electrode result in generation of an ultrasound wave by the more than one transducer elements which are in electrical contact with the at least one electrode.

10. A method for performing ultrasound scanning of an object, the method comprising the steps of:
   (a) placing a two dimensional array of transducer elements up against the object;
   (b) placing next to the two dimensional array of transducer elements a plurality of electrodes arranged in a pattern so that electrodes in the pattern are in electrical contact with a first set of transducer elements from the array of transducer elements which are immediately adjacent to the electrodes;
   (c) placing electrical signals through the plurality of electrodes resulting in generation of an ultrasound wave by the first set of transducer elements, the ultrasound wave substantially conforming to the pattern; and,
   (d) moving with respect to the two dimensional array of transducer elements, the plurality of electrodes, resulting in generation of the ultrasound wave by a second set of transducer elements, the second set of transducer elements being different than the first set of transducer elements.

11. A method as in claim 1 wherein step (c) includes arranging the pattern to be a plurality of annuli.

12. A method as in claim 1 wherein step (c) includes arranging the pattern to be in a Fresnel pattern.

13. A method as in claim 1 wherein step (b) includes mounting the electrode array on a thin Mylar membrane.

14. A method as in claim 1 wherein in step (d) includes rotating the plurality of electrode with respect to the two dimensional array of transducer elements.

15. A method as in claim 14 wherein step (b) includes mounting the electrodes on a plate and electrically isolating the electrodes from each other by gaps.

* * * * *